United States Patent
Ancheta

(10) Patent No.: US 11,238,138 B1
(45) Date of Patent: Feb. 1, 2022

(54) SYSTEMS AND METHODS TO FACILITATE AUTHORIZATION KEY OBFUSCATION VALIDATION

(71) Applicant: BLUEOWL, LLC, San Francisco, CA (US)

(72) Inventor: Marco Ancheta, Bloomington, IL (US)

(73) Assignee: BLUEOWL, LLC, San Francisco, CA (US)

(*) Notice: Subject to any disclaimer, the term of this patent is extended or adjusted under 35 U.S.C. 154(b) by 136 days.

(21) Appl. No.: 16/678,710

(22) Filed: Nov. 8, 2019

(51) Int. Cl.
*G06F 21/14* (2013.01)
*H04L 9/08* (2006.01)

(52) U.S. Cl.
CPC ............ *G06F 21/14* (2013.01); *H04L 9/0891* (2013.01); *G06F 2221/0748* (2013.01)

(58) Field of Classification Search
CPC . G06F 21/14; G06F 2221/0748; H04L 9/0891
See application file for complete search history.

(56) References Cited

U.S. PATENT DOCUMENTS

| | | | | |
|---|---|---|---|---|
| 2003/0037239 | A1* | 2/2003 | Leung | G06F 9/468 713/169 |
| 2014/0026127 | A1* | 1/2014 | McEwan | G06F 8/37 717/146 |
| 2018/0176229 | A1* | 6/2018 | Bathen | H04W 12/106 |
| 2018/0260430 | A1* | 9/2018 | Tschudin | G06F 21/6263 |
| 2018/0349577 | A1* | 12/2018 | Goldwasser | H04L 63/0478 |
| 2019/0050591 | A1* | 2/2019 | Rane | H04L 9/008 |

\* cited by examiner

*Primary Examiner* — Hee K Song
(74) *Attorney, Agent, or Firm* — Faegre Drinker Biddle & Reath

(57) ABSTRACT

A device for validating authorization key obfuscation in a continuous integration (CI) pipeline codebase is presented. The device comprises a transceiver, one or more memories, and one or more processors interfacing with the transceiver and the one or more memories. The one or more processors are configured to receive an update to the CI pipeline codebase. The update may include an authorization key, which the one or more processors store in the one or more memories. The one or more processors may perform a build process to integrate the update into the CI pipeline codebase. The build process may include an obfuscation, which creates an obfuscated CI pipeline codebase. The one or more processors may also scan the obfuscated CI pipeline codebase to determine a presence or an absence of the authorization key.

20 Claims, 6 Drawing Sheets

Codebase Manager

340

342  Obfuscated Codebase  344

| | | | | | | | | | | | |
|---|---|---|---|---|---|---|---|---|---|---|---|
| 1 | 7bd5 | 59f5 | 022d | 8ce7 | 4afc | 1d41 | 71f8 | cfdf | | | |
| 2 | e4a4 | 2aa2 | 641e | 8c81 | 11b1 | 4b07 | d3c1 | 879b | | | |
| 3 | c9d3 | 0593 | 93c5 | 8254 | 4360 | f72a | 4953 | f100 | | | |
| 4 | 27bc | fc8f | f1c5 | 66aa | 1f4f | 77f1 | 939d | 45b3 | | | |
| 5 | c962 | 0948 | b449 | 4041 | 5212 | 2e30 | 96f9 | 44ef | | | |
| 6 | 15d4 | 275d | 351d | d88f | 94a6 | 2aab | 8b44 | 9436 | | | |
| 7 | 289e | 4af6 | 2513 | d9ab | 5cad | 1d93 | 45bb | 3196 | | | |
| 8 | c31a | 54e3 | 2633 | c48d | 31b5 | 95b5 | 23c5 | 65aa | | | |
| 9 | 1f4f | 77f1 | 939d | 45b8 | c962 | 0948 | b449 | 4041 | | | |
| 10 | 5212 | 2e30 | 96f9 | 44ef | 15d4 | 275d | 351d | d00f | | | |
| 11 | 94a6 | 2aab | 8bbd | ed37 | ef08 | cfc6 | c535 | 3a17 | | | |
| 12 | 95e8 | 24ee | 1388 | 88ba | 5b72 | cda0 | a4c8 | 1350 | | | |
| 13 | cd9b | 9472 | aca7 | 65d3 | 145b | 05d9 | c642 | c62d | | | |
| 14 | afcc | 0f97 | 5a50 | 3647 | 50cc | b9e1 | e4c3 | a915 | | | |
| 15 | f64d | c03f | f622 | 3c3c | 8251 | 6bb7 | bd8c | 839f | | | |
| 16 | 4812 | 8195 | e679 | c13c | fd1c | 6346 | 5470 | da4c | | | |
| 17 | 887e | 8f67 | 666a | 8a46 | ddd0 | ab10 | b223 | 8c2b | | | |
| 18 | b71b | 9478 | 01b0 | 65b1 | 6456 | cfc2 | e56f | 7dd4 | | | |
| 19 | aa32 | da3d | 0533 | 4a92 | 3827 | 574b | d5dd | d9f1 | | | |
| 20 | 58d9 | 1532 | e929 | b36f | 5d61 | 1f2a | 72b9 | 6a04 | d33b | | |
| 21 | 6424 | e867 | f7a9 | 5d61 | 1f2a | 72b9 | 6a04 | d33b | | | |
| 22 | 8afe | d9e5 | 24ac | a8a5 | 2c2d | 13c5 | f23d | dcc8 | | | |
| 23 | de48 | 3953 | 560e | dce9 | 9394 | 5908 | ed78 | c0fc | | | |
| 24 | 57bf | 16bc | 918b | d971 | 852f | f64b | fcc3 | db80 | | | |
| 25 | 6f28 | 2ff4 | ac52 | 30e5 | c2f2 | 7ca0 | 42de | b558 | | | |
| 26 | 08cb | 9f17 | 49fa | 7410 | 9795 | f9e4 | 9f59 | 0365 | | | |
| 27 | d5c3 | 227f | 5bdd | 5ef8 | d7ca | 2d32 | 6fb6 | 84fc | | | |
| 31 | a835 | 8657 | 3f45 | 37b1 | 73f8 | 6666 | 093c | | | | |
| 32 | bc96 | 6b8b | c6b8 | 00c7 | c759 | a896 | 6f4e | 9f9f | | | |
| 33 | ddf5 | c8b4 | b53d | 4da4 | 7c75 | 6b5d | 09a1 | 6a38 | | | |
| 34 | 362e | d3c2 | c63a | e7c0 | 936e | 8566 | cfa3 | 8f12 | | | |
| 35 | a221 | d8ac | def4 | 5057 | 8336 | 1d9c | 4cef | 5936 | | | |
| 36 | c80f | 897d | 5b23 | 6129 | 3980 | 2b5d | 6f6b | d236 | | | |
| 37 | 684a | 8cac | 528f | 928c | 6f94 | 5609 | e74b | 136c9 | | | |
| 38 | a4db | 986f | c68e | 7eaf | b758 | a61b | d712 | 3110 | | | |
| 39 | ce04 | 2bec | 94d3 | d926 | 84c1 | 42cb | 8a84 | cab7 | | | |
| 40 | ac09 | 872c | 30dc | 103d | 8f8a | 48cf | fad1 | b7f5 | | | |
| 41 | 6b52 | 3bd5 | f8f6 | d7e2 | 118a | 33f9 | 8b1f | bf17 | | | |
| 42 | 2443 | 9a46 | 2816 | 2b90 | 273f | be70 | 2b0a | 19e7 | | | |
| 43 | 45af | 2f9b | 5c64 | 07f9 | 043a | 9bb8 | eab4 | a50f | | | |
| 44 | fc4d | 6592 | fe49 | 9359 | c5ea | c6fa | ced2 | 5fa4 | | | |
| 45 | 3ab1 | a1f3 | fdff | 49eb | 8a17 | 3911 | f763 | b8ba | | | |
| 46 | 99c3 | 2991 | e927 | 863e | 2aca | d276 | e143 | 7d90 | | | |
| 47 | ea70 | eaec | 8a2a | a806 | 4e6a | 9c73 | e7cb | 6c69 | | | |
| 48 | a127 | 7fad | 805f | c435 | 7ddf | a79d | bf5 | bc8a | | | |
| 49 | 3aeb | a7e9 | 38b3 | 8599 | 476f | 6fd0 | 4505 | f04c | | | |
| 50 | fef2 | 0fcf | bb5d | 51ba | 0cac | 8d1c | bb74 | 1c85 | | | |
| 51 | 277d | 1e28 | bfb8 | f51d | efcc | 9cb7 | d5b5 | 670d | | | |
| 52 | 2a83 | 56b0 | a301 | 4ffe | 48be | 5aff | 0b5c | | | | |
| 53 | 742d | 843c | cc f4 | 9d1e | 14cf | ddd8 | a1cc | 53cd | | | |
| 54 | f2b8 | 2a81 | 461d | 78cc | 0c26 | 4c39 | 039d | 9ff4 | | | |
| 55 | 1820 | f733 | 48d6 | f9e7 | 687c | 4b21 | b537 | 3224 | | | |
| 56 | 7bd1 | d61d | 9390 | e4a8 | 923e | 22b6 | 204b | ff7b | | | |
| 57 | b1b6 | e50b | 0470 | 80a8 | 0d9a | 9e51 | 3fdd | 7e58 | | | |
| 58 | 8d1c | 247a | 96b1 | 29eb | 6308 | 9983 | fb | | | | |

FIG. 3C

SYSTEMS AND METHODS TO FACILITATE AUTHORIZATION KEY OBFUSCATION VALIDATION

FIELD OF THE DISCLOSURE

The present disclosure generally relates to authorization key obfuscation and, more particularly, to systems and methods to validate authorization key obfuscation in a continuous integration (CI) pipeline codebase.

BACKGROUND

The rise of mobile devices has yielded a corresponding rise in mobile applications. These mobile applications enjoy widespread usage across a broad variety of industries and can contain a plethora of sensitive information. Unfortunately, such applications suffer from issues resulting in security hazards for application owners and customers alike.

Namely, such applications can be reverse engineered or unpackaged by customers and non-customers. Traditional obfuscation tools are complicated, and facilitate confusion among application designers/owners. Thus, traditional obfuscation tools allow application designers/owners to accidentally remove or reject authorization key obfuscation, resulting in unobscured authorization keys in the app. This would result in leaked sensitive information, and lower overall security.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, an authorization key obfuscation validation device for validating authorization key obfuscation in a CI pipeline codebase may be provided. The device may comprise: a transceiver; one or more memories; and one or more processors interfacing with the transceiver and the one or more memories. The one or more processors may be configured to: receive an update to the CI pipeline codebase, the update including an authorization key; store the authorization key in the one or more memories; perform a build process to integrate the update into the CI pipeline codebase, wherein the build process includes an obfuscation, and wherein the obfuscation creates an obfuscated CI pipeline codebase; and scan the obfuscated CI pipeline codebase to determine a presence or an absence of the authorization key.

In another embodiment, an authorization key obfuscation validation method for validating authorization key obfuscation in a CI pipeline codebase may be provided. The method may comprise: receiving an update to the CI pipeline codebase, the update including an authorization key; storing the authorization key in one or more memories; performing a build process to integrate the update into the CI pipeline codebase, wherein the build process includes an obfuscation, and wherein the obfuscation creates an obfuscated CI pipeline codebase; and scanning the obfuscated CI pipeline codebase to determine a presence or an absence of the authorization key.

In yet another embodiment, a computer readable storage medium comprising non-transitory computer readable instructions stored thereon for validating authorization key obfuscation in a CI pipeline codebase may be provided. The instructions when executed on one or more processors may cause the one or more processors to: receive an update to the CI pipeline codebase, the update including an authorization key; store the authorization key in one or more memories; perform a build process to integrate the update into the CI pipeline codebase, wherein the build process includes an obfuscation, and wherein the obfuscation creates an obfuscated CI pipeline codebase; and scan the obfuscated CI pipeline codebase to determine a presence or an absence of the authorization key.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 3C depicts yet another example GUI for an operational embodiment of, for example, the system of FIG. 2;

The figures depict various aspects of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
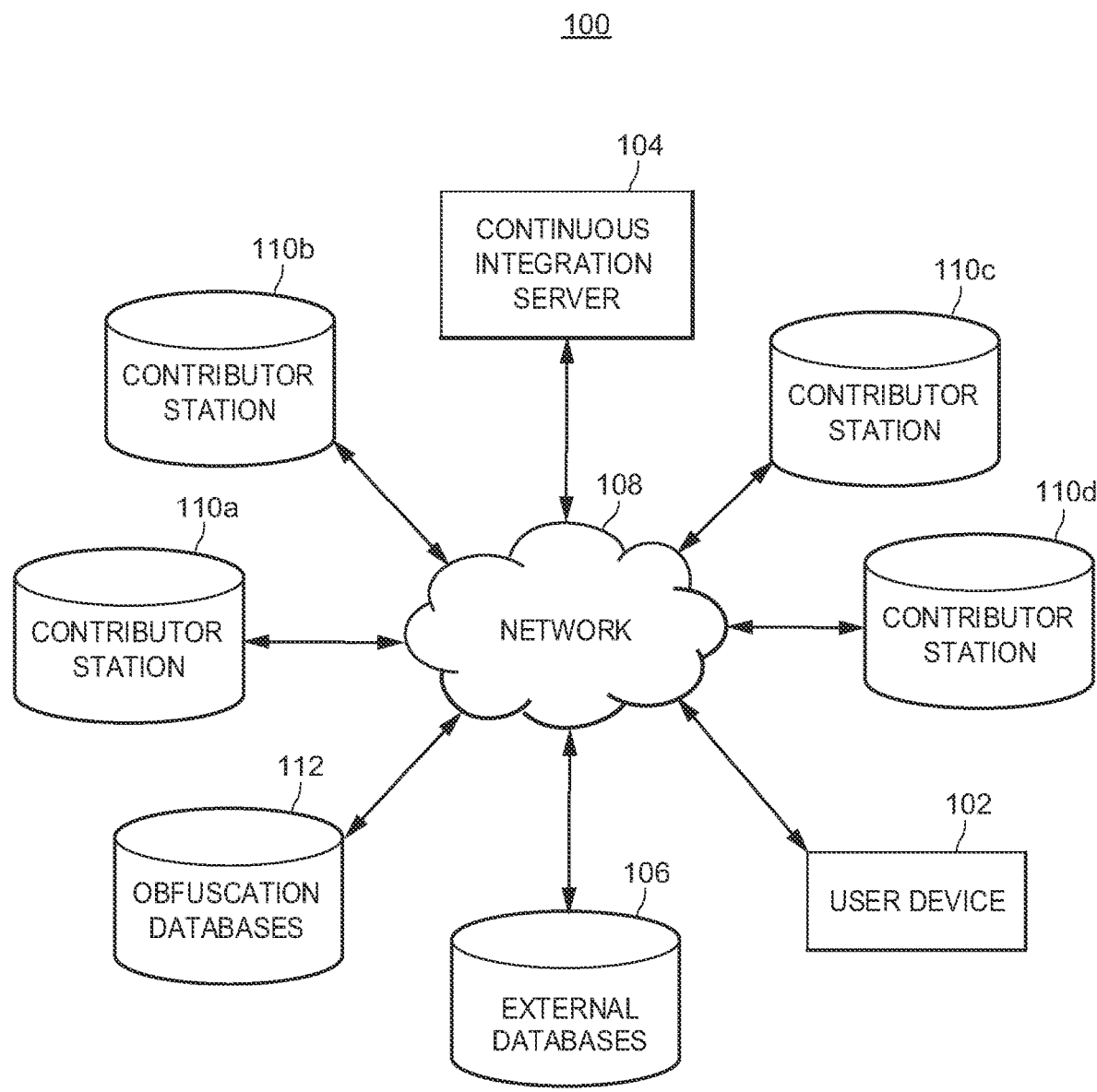
FIG. 1 illustrates an example system for facilitating authorization key obfuscation validation.

I. Example System and Related Functionality for Facilitating Authorization Key Obfuscation Validation FIG. 1 illustrates an example eventing system 100 for facilitating authorization key obfuscation validation. The example system 100 may include a user device 102, a continuous integration (CI) server 104 (additionally referenced herein as a "CI server"), external databases 106, a network 108, a plurality of contributor stations 110a-110d, and obfuscation databases 112. While illustrated in FIG. 1 as a single external database, in some embodiments the external databases 106 and the obfuscation databases 112 may include two or more databases. The network 108 may be a computer network of an insurance provider (e.g., provided or used by the insurance provider or communications over which the insurance provider otherwise controls or facilitates). The user device 102, and each of the computing devices referred to herein, may be any suitable computing device such as, but not limited to, a desktop computer, a laptop computer, a mobile phone such as a smart phone, a tablet, a phablet, smart glasses, other wearable computing device(s), etc.

The CI server 104 may include a codebase and may be configured to receive real-time codebase updates. The codebase updates may update a single end-user or client application, or the updates may be applicable to a plurality of applications and/or system architectures. Moreover, the contributor stations 110a-110d may be individual workstations configured to upload such codebase updates to the CI server 104. Once received, the CI server 104 may facilitate obfuscation of the authorization keys included in the codebase updates, in accordance with embodiments of the present disclosure, before pushing the codebase updates and/or the updated codebase to the user device 102. Thus, the CI server 104, contributor stations 110a-110d, and the user device 102 represent a continuous integration pipeline through which codebase updates can be continuously provided to client applications. Consequently, and in embodiments, the CI server 104 may retrieve an obfuscation protocol/method from external databases, such as obfuscation databases 112 and/or external databases 106.

In embodiments, the network 108 may be or may include a network such as the Internet and/or any other type of suitable network (e.g., a local area network (LAN), a metropolitan area network (MAN), a wide area network (WAN), a mobile network, a wired or wireless network, a private network, a virtual private network, etc.). The network 108 may also or alternatively be or include one or more cellular networks such as code division multiple access (CDMA) network, GSM (Global System for Mobile Communications) network, WiMAX (Worldwide Interoperability for Microwave Access) network, Long Term Evolution (LTE) network, etc.

Figure 2:
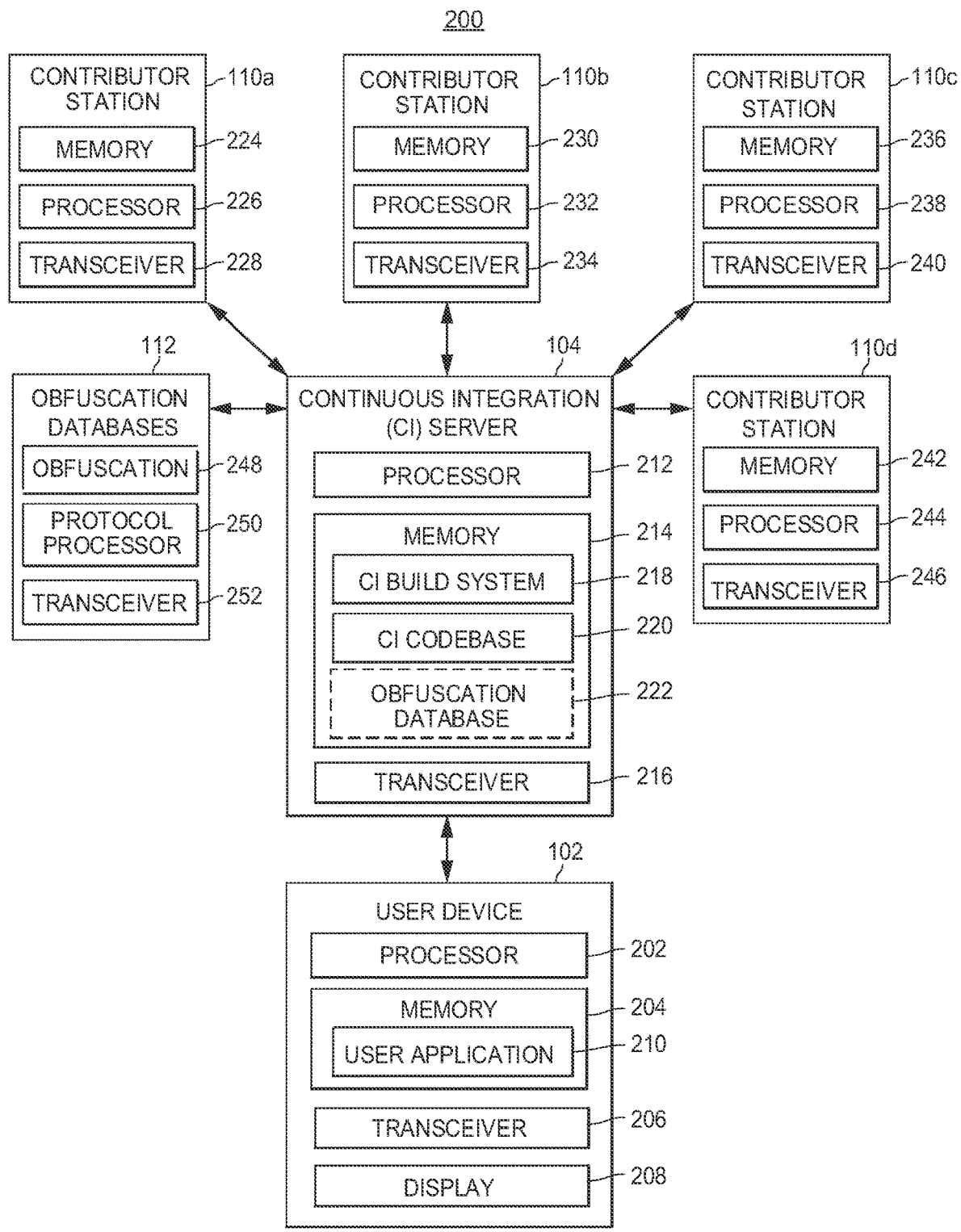
FIG. 2 illustrates another example system for facilitating authorization key obfuscation validation.

In reference to the example eventing system 200 of FIG. 2, the user device 102 may include a processor 202, a memory 204, a transceiver 206, and a display 208. While referred to herein as a "processor" and a "memory," in some embodiments the processor 202 includes two or more processors and the memory 204 includes two or more memories. The memory 204 may include a user application 210 and may store computer-executable instructions, which may be executed by the processor 202.

The display 208 may be configured to display one or more update notifications. For example, the user device 102 may be configured to receive communications from the continuous integration server 104 and/or other suitable transmitters (e.g., contributor stations 110a-110d, obfuscation databases 112). The continuous integration server 104 may transmit an update notification to the user device 102, wherein the transceiver 206 will receive the update and the processor 202 will execute instructions to facilitate display of the notification on the display 208. Moreover, the processor 202 may execute instructions to display the notification on the display 208 before, during, or after the update contained in the update notification is integrated into the codebase of the user application 210.

The continuous integration server 104 may include a processor 212, a memory 214, and a transceiver 216. In embodiments, the memory 214 may include a CI build system 218, CI codebase 220 (also referenced herein as a "CI pipeline codebase"), and optionally include an obfuscation database 222. While referred to herein as a "processor" and a "memory," in some embodiments the processor 212 includes two or more processors and the memory 214 includes two or more memories.

For example, the CI build system 218 may include a set of instructions that, when executed by the one or more processors 212, cause the processors 212 to integrate a codebase update into the CI codebase 220. Part of those instructions may include an obfuscation (additionally referenced herein as an "obfuscation protocol"), through which, the CI build system 218 may obfuscate the codebase update and/or the codebase included in the CI codebase 220. In embodiments, the CI build system 218 may include instructions that, when executed by the one or more processors 212, cause the one or more processors 212 to obtain the obfuscation from the obfuscation database 222. Alternatively or additionally, the CI build system 218 may include instructions that, when executed by the one or more processors 212, cause the one or more processors 212 to obtain the obfuscation from the obfuscation databases 112 and/or any other suitable external data source or combination thereof. In this way, the CI server 104 is able to efficiently receive, obfuscate, and integrate codebase updates from a plurality of contributing stations (e.g., contributor stations 110a-110d) into the CI codebase 220 in real-time.

Each of the contributor stations 110a-110d are communicatively coupled to the CI server 104. The stations 110a-110d may each include a memory (224, 230, 236, 242), a processor (226, 232, 238, 244), and a transceiver (228, 234, 240, 246). While referred to herein as a "processor" and a "memory," in some embodiments the processors (226, 232, 238, 244) each include two or more processors and the memories (224, 230, 236, 242) each include two or more memories. As mentioned herein, each of the contributor stations 110a-110d represent an individual workstation configured to communicate codebase updates to the CI server 104.

For example, the contributor station 110a may represent an individual workstation for an operator who creates, designs, writes, edits/modifies, and/or otherwise contributes to codebase updates related to the CI codebase 220. The contributor station 110a may store any codebase updates on memory 224, and may utilize the processor 226 to facilitate editing/creating the codebase updates. Once such codebase updates are completed, the contributor station 110a may transmit the codebase updates to the CI server 104 via the transceiver 228. It is to be understood that such transmission may be completed through any suitable communication protocols between the station 110a and the server 104, including live streaming the update data to facilitate real-time CI codebase 220 updates.

The obfuscation databases 112 may represent any storage device capable of storing an obfuscation protocol 248. The databases 112 may also include a processor 250 and a transceiver 252. While referred to herein as a "processor," in some embodiments the processor 250 includes two or more processors. The obfuscation protocol 248 may be any protocol, routine, and or other set of instructions capable of obfuscating codebase updates to the CI codebase 220. For example the CI server 104 may communicate with the obfuscation databases 112, via the transceivers (216, 252), to retrieve the obfuscation protocol 248. The CI server 104 may then utilize the protocol 248 to obfuscate codebase updates received from one or more of the contributor stations 110a-110d, and eventually transmit the obfuscated CI codebase containing obfuscated codebase updates to the user device 102 as an update to, for example, the user application 210.

As mentioned, the obfuscation protocol 248 is configured to obfuscate the codebase updates to the CI codebase 220. Generally speaking, obfuscation refers to the process of modifying a set of code (e.g., source code, machine code, etc.) such that, after obfuscation, the set of code is more difficult for a human being and/or computer program to interpret. In this way, obfuscation may increase an application's security by making the source and/or machine code more difficult to interpret/copy. Thus, the CI server 104 may increase the security of, for example, the user application 210 by utilizing the obfuscation protocol 248 to obfuscate the application's 210 CI codebase 220.

The continuous integration server 104 may be connected to the user device 102, the contributor stations 110*a*-110*d*, and the obfuscation databases 112 via the network 108, such that all devices (102, 104, 110*a*-110*d*, 112) may communicate to each other via their respective transceivers (206, 216, 228, 234, 240, 246, 252). For example, one or more of the contributor stations 110*a*-110*d* may transmit a codebase update to the server 104 for integration into the CI codebase 220. The CI server 104 may receive the one or more codebase updates and run the instructions included in the CI build system 218 to integrate the codebase updates into the CI codebase 220. During the build process, the server 104 may communicate with one or more obfuscation databases 112 to retrieve an obfuscation protocol 248. Using the obfuscation protocol (retrieved either from the databases 112 and/or the optional obfuscation database 222), the CI server 104 may obfuscate the codebase updates and complete the build process by integrating the codebase updates into the CI codebase 220. Afterwards, the continuous integration server 104 may transmit an update notification, containing the obfuscated codebase updates, to the user device 102 for processing. The user device 102 may receive the update notification, and display the notification to the user via the display 208 indicating the update to the application 210.

In embodiments, the user device 102 may generate a successful integration signal or a failure integration signal in response to receiving the update notifications and attempting to update the user application 210. As used herein, the user device 102 may generate such signals in response to the device 102 successfully integrating the obfuscated CI codebase into the codebase of the user application 210 (e.g., generating a successful integration signal), by the device 102 failing to integrate the obfuscated CI codebase into the codebase of the user application 210 (e.g., generating a failure integration signal), and/or by user intervention (e.g., a faulty integration of the obfuscated CI codebase that goes unreported by the device 102, generating a failure integration signal).

The user device 102 may transmit these signals to the continuous integration server 104, indicating the device 102 did or did not successfully integrate the codebase update included in the update notification. The continuous integration server 104 may store this received signal in, for example, its memory 214. Thus, and as discussed further herein, the continuous integration server 104 may be configured to process, analyze, or otherwise interpret data received from the user device 102. It will be appreciated that the continuous integration server 104, user device 102, contributor stations 110*a*-110*d*, and/or the obfuscation databases 112 or any combination thereof may be a server and/or device provided by or used by an insurance provider, or use of which the insurance provider otherwise controls or facilitates.

In embodiments, the CI build system 218 may include a build process model. The processor 212 may be configured to facilitate authorization key obfuscation via the build process model. The build process model may be a dynamically updated build process model, and the CI server 104 may update the model through, for example, machine learning algorithms. These machine learning algorithms may include neural networks, deep learning algorithms, regression algorithms, Bayesian algorithms, clustering algorithms, and/or any other suitable updating technique or combination thereof.

Moreover, and in embodiments, the user device 102 may also have a build process model. The device's 102 model may perform similar algorithmic analysis, but may be limited with regard to the information used during its analysis and the type of actions the model is configured to facilitate. For example, the device 102 may receive an update notification containing an obfuscated CI codebase from the CI server 104 via the network 108. While analyzing the update notification, the device 102 may determine that the update notification must be unobfuscated before the obfuscated CI codebase may be integrated into the codebase of the user application 210. Thus, the device 102 may execute an series of instructions included in the device's 102 model to remove the obfuscation from the obfuscated CI codebase and integrate the codebase updates into the user application 210 codebase.

As further described below, the example systems (100, 200) facilitate authorization key obfuscation validation, and allow various advantages. The systems (100, 200) identify and store authorization keys prior to the build process. Thus, the systems (100, 200) do not suffer from an inability to validate the obfuscation process because the systems (100, 200) can accurately and efficiently check the obfuscated codebase for the original, unobfuscated authorization keys. Moreover, the systems (100, 200) allow the authorization keys to change between obfuscation events without any increased security risk. The system (100, 200) performs a straightforward, ubiquitous validation procedure that enables the syntax, formatting, etc. of the authorization keys to change without invalidating the procedure. In this way, the system (100, 200) permits operators (e.g., those operating the contributor stations 110*a*-110*d*) to structure their authorization keys in whatever way they deem appropriate. Thus, the system (100, 200) increases the overall flexibility of the continuous integrated pipeline architecture by not requiring a uniform formatting across all authorization keys contained in codebase contributions.

II. Example Operational Embodiments of the System

Figure 3A:
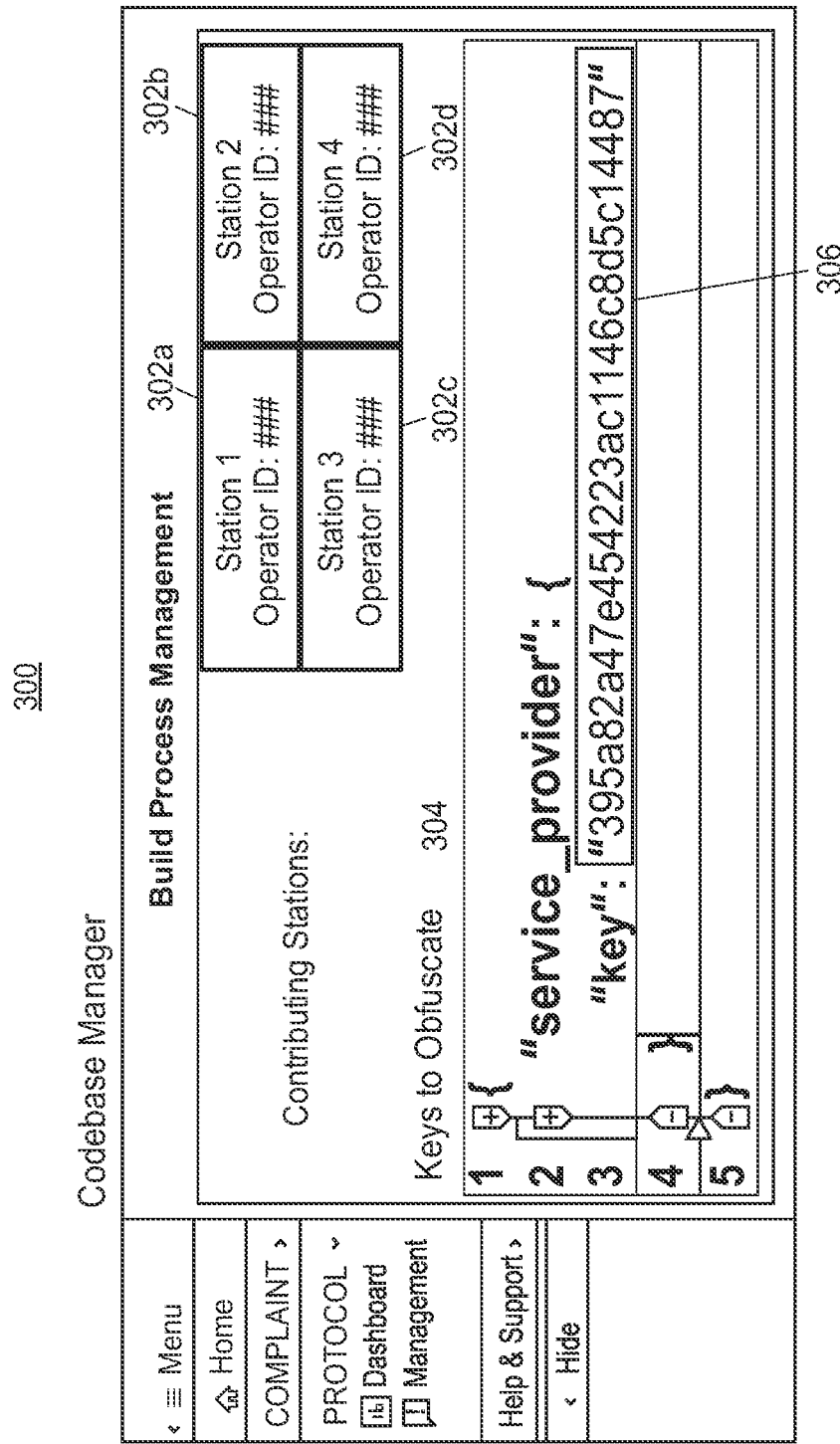
FIG. 3A depicts an example graphical user interface (GUI) for an operational embodiment of, for example, the system of FIG. 2.

FIG. 3A depicts an example graphical user interface (GUI) 300 for an operational embodiment of, for example, the system 200 of FIG. 2. The GUI 300 may represent, for example, the display of a workstation connected to a CI server (e.g., CI server 104). The GUI 300 includes a set of contributing station displays 302*a*-302*d*. In practice, these displays may represent the stations (e.g., contributor stations 110*a*-110*d*) from which the CI server receives codebase updates. The display may feature contributing stations that have most recently made contributions to the CI codebase, those contributing stations that have made the most contributions to the CI codebase, and/or contributing stations for any other reason or combination thereof. Further, the GUI 300 may include sorting/filtering options to display contributing stations that have contributed codebase updates similar to those featured in the authorization key display 304.

The station displays 302*a*-302*d* may each include a contributing station number (represented in FIG. 3A as "Station 1," "Station 2," etc.) and a station/operator identifier. For example, in systems where each operator has a unique identifier associated with information used to log into the system, the operator identifier may appear in a respective station display 302a-302d. Additionally or alternatively, in systems featuring a particular number of contributing stations with authorization to access the CI server, each contributing station may have an associated identifier, and that identifier may appear in a respective station display 302a-302d.

In embodiments, the GUI 300 may feature authorization keys 306 included in recent codebase updates in the authorization key display 304. Generally speaking, authorization keys are character strings included in a codebase for the purpose of authenticating data transfers to/from the codebase. Moreover, each codebase may contain one authorization key or, in embodiments, may contain two or more authorization keys. For example, the two or more authorization keys may represent authorization requirements for different types of data transfers to/from the codebase. Additionally or alternatively, any respective authorization key may represent an authorization protocol(s) allowing an application (e.g., user application 210) to communicate with other applications, to transfer information across domain types (e.g., from .com to .net), and/or to transfer information between data sources utilizing distinct languages (e.g., JavaScript, Python, C#, Ruby, SQL, etc.), syntaxes (e.g., xml to html), or any combination thereof.

As illustrated, the authorization keys 306 may be a string of alphanumeric characters, but it should be understood that the keys 306 may include and/or be comprised of any suitable symbology. For example, the authorization key 306 may include alphanumeric characters, special characters (e.g., #, @, !, %, etc.), characters from different alphabets/languages (e.g., Cyrillic characters, Chinese characters, etc.), and/or any other suitable symbology or combination thereof. Correspondingly, the syntax of any authorization key referenced herein may validly include any such symbology. Moreover, the symbology representing the authorization key 306 may be the original, unobfuscated representation of the key 306, or the obfuscated representation.

To illustrate, assume the CI server receives a codebase update from a contributor station. As mentioned, the contributing station number, contributor station identifier, and/or the operator identifier may appear in a contributing station display 302a-302d. Moreover, the codebase update from the contributor station may include at least one authorization key corresponding to the particular codebase updates provided therein. Upon receipt, the CI sever may check the codebase update to determine the presence of any authorization keys. In embodiments, and as further discussed herein, the CI server may automatically recognize such updates. However, the CI server may also receive a command, instruction, or other input before, simultaneously with, or after receiving the codebase update notifying the CI server to the presence of the at least one authorization key.

After receiving the notification, the CI server may scan the codebase update to identify the at least one authorization key. The server may extract the at least one authorization key from the codebase update and store the at least one authorization key in memory. Moreover, the CI server may also display the extracted at least one authorization key in the authorization key display 304 for review by the operator. For example, an operator at a contributor station (e.g., contributor stations 110a-110d) may upload a codebase update to the CI server which includes the at least one authorization key. The operator may also include the notification referenced above to notify the CI server to the presence of the at least one authorization key. Once the CI server extracts the at least one authorization key from the codebase update, the server may display the extracted key to the operator for their approval. In embodiments, if the operator approves the CI server's indication of the at least one authorization key included in the codebase update, the server may proceed with further operations described herein. Alternatively, if the operator does not approve the CI server's indication of the at least one authorization key included in the codebase update, the server may re-scan the codebase update in an attempt to correctly identify the at least one authorization key and/or refuse to perform a build process to integrate the codebase update into a CI codebase (e.g., CI codebase 220).

In any event, should the authorization key extraction process succeed, the system may proceed to perform a build process to integrate the codebase update into the codebase. Thus, the CI server may transition the display from GUI 300 to GUI 320.

Figure 3B:
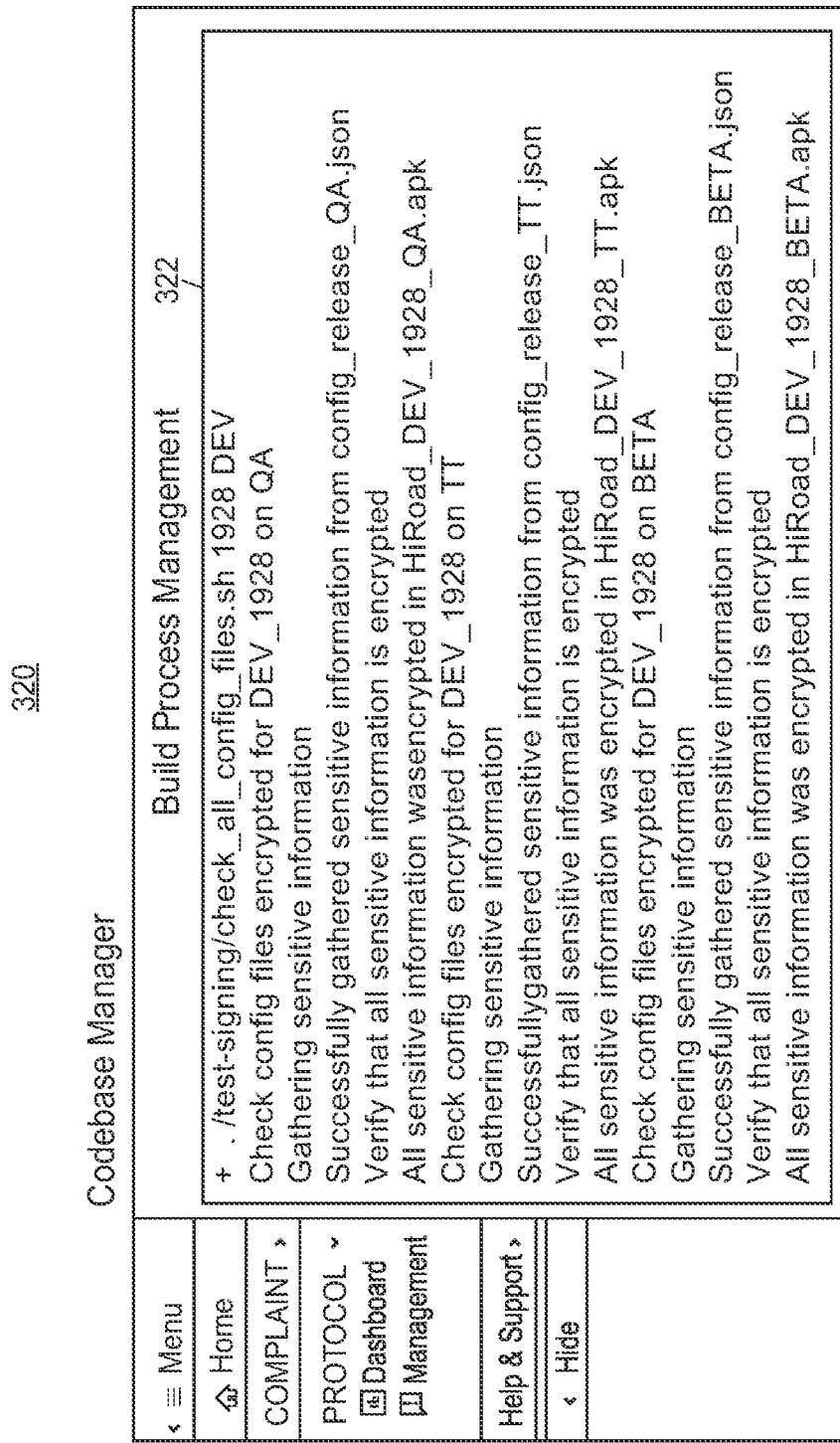
FIG. 3B depicts another example GUI for an operational embodiment of, for example, the system of FIG. 2.

FIG. 3B depicts the example graphical user interface (GUI) 320 for an operational embodiment of, for example, the system 200 of FIG. 2. Generally, the GUI 320 may represent an example display the CI server may provide during and/or after the build process. The build process, as further described herein, refers to the routine implemented by the CI server to integrate any codebase updates into the CI codebase. Functionally speaking, the CI server performs the build process to implement the changes contained and/or derived from the codebase updates into the CI codebase by applying or otherwise causing alterations to the source code, machine code, and/or any other code designation.

While the CI server performs the build process, or after the CI server has concluded the build process, the CI server may additionally output signals to an external display to inform users, operators, and/or other parties of the build process status 322. These signals may be displayed in a fashion similar to GUI 320, and may contain information such as that shown in the build process status 322. For example, the build process status 322 may include information in raw code format (e.g., source code, machine code, object code, etc.) or in a format configured for human interpretation (e.g., plain text). Moreover, in embodiments, the CI server may select portions of the output from the build process for display to emphasize relevant information. The CI server may display portions of the build process output related to, for example, the obfuscation of the authorization keys.

Moreover, the CI server may display information related to the build process, as depicted in the GUI 320, requiring an interaction from the user, operator, or and/or other parties or combinations thereof (collectively referenced as the "observers"). For example, the Ci server may display a notification in the build process status 322 to indicate that the build process has stalled or otherwise failed. This notification may include steps the observers may take to remedy the condition reflected in the notification, and/or provide interactive steps the observers may take. For example, if the GUI 320 is displayed on a touch-sensitive display (e.g., display 208), the notification may provide a button, sliding pop-up text box, and/or other interactive object to the observer. These interactive objects, when activated through user interaction, may cause the CI server to, for example, retry the build process.

Regardless, once the build process is complete, the system may proceed to check the obfuscated codebase to determine whether any unobfuscated authorization keys remain in the codebase. Consequently, the CI server may transition the display from GUI 320 to GUI 340.

FIG. 3C depicts the example graphical user interface (GUI) 340 for an operational embodiment of, for example, the system 200 of FIG. 2. As previously stated, the server may scan the obfuscated codebase to determine whether any unobfuscated authorization keys remain in the codebase. If, for example, the server determines that an unobfuscated authorization key remains in the obfuscated codebase, the server may display the location of the unobfuscated authorization key in the codebase. To illustrate, the server may display a portion or all of the source code included in a codebase in a code display region 342, 344. In embodiments, the server may additionally highlight, color, or otherwise indicate the source code portion containing the unobfuscated authorization key.

Ideally, the build process will leave no authorization keys unobfuscated. Thus, the server may choose not to display any of the source code. However, even in the ideal case, the server may still display a portion or all of the obfuscated source code. In this way, the CI server may facilitate the observers checking the build process' obfuscation to make sure it meets obfuscation expectations. Moreover, in embodiments, the server may utilize multiple code display regions 342, 344 to emphasize and/or simply showcase the obfuscation. As an example, the CI server may execute the build process, and use the display region 342 to display the unobfuscated codebase and the display region 344 to display the obfuscated codebase.

Figure 4:
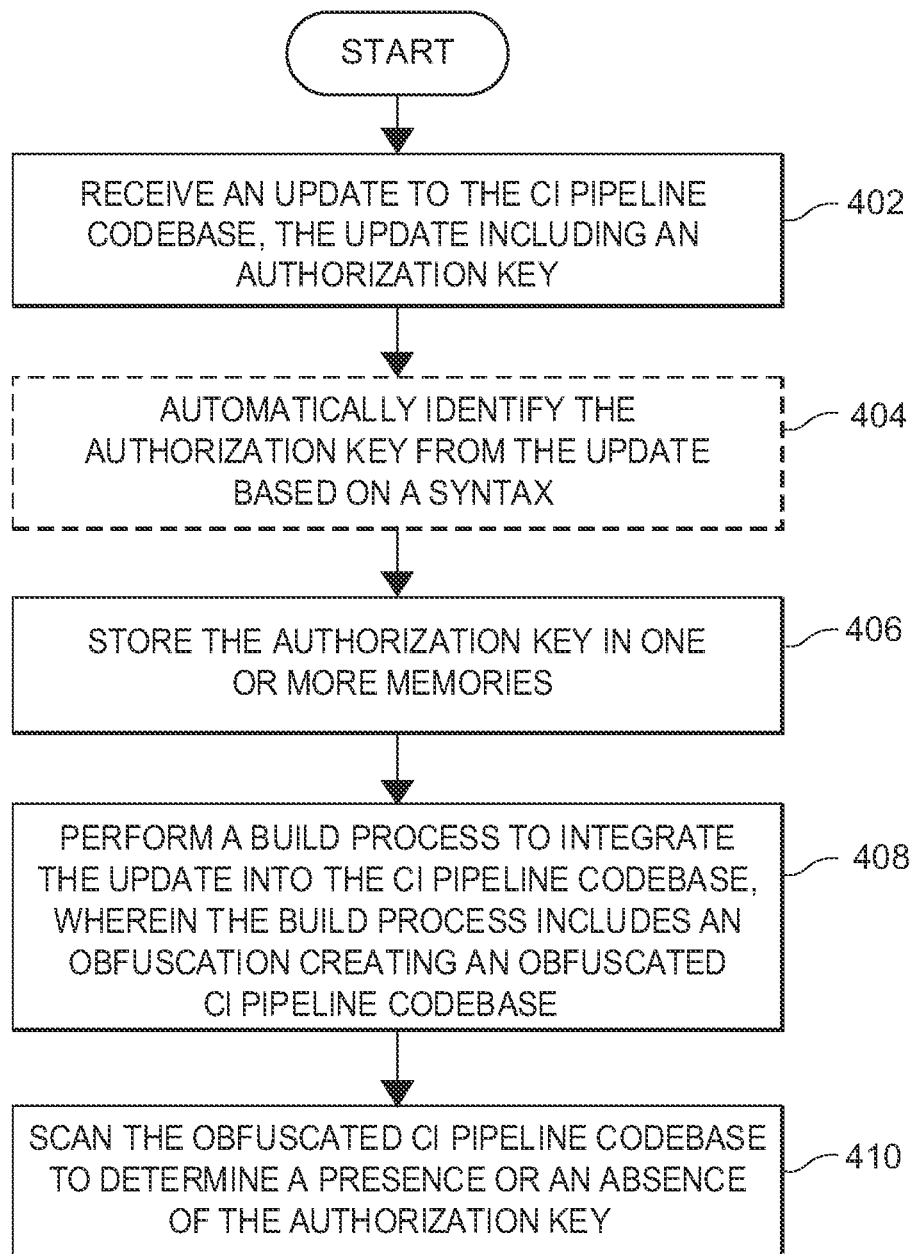
FIG. 4 is a flowchart depicting an example method corresponding to various embodiments of the present disclosure.

III. Example of a Method for Facilitating Authorization Key Obfuscation Validation FIG. 4 is a flowchart depicting an example method 400 corresponding to various embodiments of the present disclosure. The method 400 begins at block 402 where, for example, a CI server (e.g., CI server 104) receives an update to the CI pipeline codebase, and the update includes an authorization key. As mentioned herein, the CI pipeline codebase (e.g., CI codebase 220) may include a set of code comprising the codebase. The codebase may further define a program through which larger scale structures such as applications (e.g., mobile applications) and others are generated. The CI server may receive updates to this codebase periodically, and the updates may perform a variety of tasks. For example, the updates may attempt to fix issues with the program's general operation, increase functionality of the program's operations, implement new features into the program, and/or any combination thereof.

Further, the CI server may receive these updates from a variety of locations. Practically speaking, and as mentioned herein, the CI server and broader system (e.g., system 200) may function properly as part of a distributed network of operators. Each of these operators may contribute to the management, maintenance, updating, etc. of the CI codebase through their respective workstations (e.g., contributor stations 110a-110d). These workstations may be remotely located with respect to the CI server, and may each be connected to the CI server through a shared network (e.g., network 108). Thus, when any one of the operator workstations attempts to upload a codebase update to the CI server, each of the other operator workstations may access and/or modify the changes made to the CI codebase through the uploaded update.

In embodiments, the authorization key contained in the codebase update has a syntax. As a general principle, and as will be understood, each authorization key uploaded to the CI server via an update will inherently possess a syntax. However, in these embodiments and as shown in optional block 404, the authorization key's syntax will enable the CI server to automatically identify the authorization key from the update based upon the syntax. Optional block 404 may be performed by, for example, the CI server 104 via the processors 212 executing instructions in accordance with one or more routines specified in the CI build system 218.

For example, and as discussed elsewhere herein, the CI server may contain a build system (e.g., CI build system 218) to facilitate the build process. The build system may also include a dynamic model to identify authorization keys. The dynamic model may be a machine learning model or other suitable model paradigm to recognize the syntax of the authorization key, and correspondingly identify the authorization key.

As an illustration, assume the CI server receives a codebase update featuring an authorization key with a similar string length to other authorization keys included in prior codebase updates. The CI server may scan the codebase update via the build system to identify authorization keys prior to performing the build process. During the scan, the build system may flag the character string representing the authorization key because it is the similar string length as previous authorization keys. More particularly, the build system may store and recognize the authorization key because it is a similar string length to authorization keys previously received from a particular contributor station. In any event, the build system's model may continuously update with each codebase update to include more relevant features of the identified authorization keys, such that each subsequent iteration of the build process features a more efficient and accurate authorization key identification protocol.

In embodiments, the authorization key may comprise (i) a first key with a first syntax and (ii) a second key with a second syntax. For example, an authorization key included in a codebase update may include a first portion intended to apply to a first portion of the CI codebase, and a second portion intended to apply to a second portion of the CI codebase. Alternatively, the first and second portions of the authorization key may apply to the same portion of the CI codebase, but may perform different functions. Regardless, when the server receives the codebase update, the build system may recognize the first key based on the first syntax and the second key based on the second syntax. Moreover, based on this recognition, the build system may separate the authorization key into its first portion and second portion to facilitate storing each respective portion in memory.

Consequently, the method 400 continues at block 406 by storing the authorization key in one or more memories. As mentioned herein, the CI server stores the authorization keys in memory in their original, unobfuscated state. Thus, the one or more memories are configured to accommodate and provide read/write access to authorization keys potentially containing a variety of syntaxes. Moreover, the memory may provide long-term storage for a plurality of authorization keys utilized in the CI codebase. Block 406 may be performed by, for example, the CI server 104 via the processors 212 executing instructions in accordance with one or more routines specified in the CI build system 218 to store the authorization key in memory 214.

For example, the CI codebase may use a limited number of authorization keys at any given time. Each of these authorization keys may be stored in memory, as well as past authorization keys (also referenced herein as "archived keys"). Storing the past authorization keys allows the system to achieve certain advantages. Namely, the system may train a model (e.g., build system 218) for automatic recognition of authorization keys in future codebase updates. For instance, when the system receives a codebase update and scans the update for authorization keys, the model may recognize the authorization keys included in the update based on similarities between the archived keys and the update's keys.

The method continues at block 408 by performing a build process to integrate the update into the CI pipeline codebase. For example, and as previously mentioned, the codebase updates may attempt to fix issues with the CI pipeline codebase's general operation, increase functionality of the CI pipeline codebase's operations, implement new features into the CI pipeline codebase's, and/or any combination thereof. Thus, and as will be appreciated, integrating the codebase updates into the CI pipeline codebase may require inserting, deleting, moving, or otherwise modifying source code related to the CI pipeline codebase. Block 408 may be performed by, for example, the CI server 104 via the processors 212 executing instructions in accordance with one or more routines specified in the CI build system 218 to perform the build process.

Moreover, the build process includes an obfuscation, such that the obfuscation creates an obfuscated CI pipeline codebase. Generally, obfuscation techniques operate in a consistent manner whereby a machine with access to the obfuscation method may readily remove the obfuscation from the codebase to reveal the original, unobfuscated codebase. For example, known obfuscation techniques include naming obfuscation (deceptive variable designations), code/comment confusion (code appearing as comments or syntactically as data), and double coding (displaying the code in unorthodox orientations/shapes). However, a system implementing various obfuscation techniques can create a codebase that is significantly more difficult to analyze. Thus, the server may acquire one or more obfuscation protocols from a variety of sources.

In embodiments, the server contains a local obfuscation protocol (e.g., obfuscation protocol 222). As such, the server may decrease processing time of the build process and subsequent codebase updates to the CI codebase by utilizing a known, readily accessible obfuscation protocol. Additionally or alternatively, the server may access external sources to acquire/retrieve obfuscation protocols. For example, the server may access an external obfuscation database (e.g., obfuscation database 112) to retrieve an obfuscation protocol (e.g., obfuscation protocol 248). It is to be understood that, in embodiments where the server contains a local obfuscation protocol, the server may actively update the local obfuscation protocol by accessing external obfuscation databases for additional and/or updated obfuscation protocols. For example, the server may access a plurality of external obfuscation databases and acquire a corresponding plurality of obfuscation protocols. The server may then store each protocol in memory, and apply each, some, or one of the stored protocols during subsequent build processes. In this way, the server may build an obfuscation database of its own, from which the server may utilize the obfuscation protocols as necessary.

The method continues at block 410 by scanning the obfuscated CI pipeline codebase to determine a presence or an absence of the authorization key. Scanning the codebase may include reading all or some of the codebase to determine the presence of the authorization key. The CI server may optimize the scan such that the codebase is analyzed with respect to the obfuscation protocol. For example, if the obfuscation protocol instructs the processors to cause the codebase to change surface-level syntax such that legitimate source code appears as comments, comments appear incorporated as source code, etc., the CI server may orchestrate the scan accordingly. Namely, the server may calibrate or otherwise instruct the scan to check for misleading syntax designations, and may further cause the scan to search for a certain (e.g., threshold) amount of misleading syntax designations, misleading syntax designations in particular relevant portions of the codebase (e.g., portions known to contain authorization keys), and/or any combinations thereof. The threshold amount of misleading syntax designations may relate to, for example, a percentage of the codebase featuring a misleading syntax designation with respect to the overall codebase. It is to be appreciated that the CI server may optimize the scan to search based on the obfuscation protocol used during the build process, or based on any other criteria. Block 410 may be performed by, for example, the CI server 104 via the processors 212 executing instructions in accordance with one or more routines specified in the CI build system 218 to scan the obfuscated CI pipeline codebase.

However, when scanning the codebase, the CI server may primarily search for authorization keys in their unobfuscated state. Thus, and in embodiments, determining the presence of the authorization key may include identifying at least a portion of the key's syntax in the obfuscated CI pipeline codebase.

For example, the authorization key may include identifying features that align with a particular known syntax to facilitate the CI server, and more particularly, the build process (e.g., CI build system 218) compiling and/or otherwise integrating the authorization key into the CI codebase. As mentioned herein, the authorization key may also include characteristic features the CI server may recognize as originating from a particular contributor (e.g., operator of a contributor station 110a-110d). Moreover, the CI server may include a syntax model used to describe the consistent and/or known acceptable syntactical features of previously received authorization keys.

Thus, the CI server, through the build process, may scan the obfuscated codebase to search for unobfuscated portions of the authorization keys. Identifying the presence of an authorization key may include identifying a threshold percentage of the syntax corresponding to the unobfuscated authorization key in the obfuscated codebase. Additionally or alternatively, the server may identify the presence of the authorization key in the obfuscated codebase by using the syntax model to pinpoint parallels between stored syntactical features of previously received authorization keys and the authorization keys in the codebase updates. Regardless, if an authorization key is identified through syntactical interpretation, a syntax model, user input, and/or any other suitable method or combination thereof, the CI server may perform additional actions to ensure the security of the CI codebase.

For example, in embodiments and responsive to determining the presence of the authorization key, the server may perform the obfuscation to create a re-obfuscated CI pipeline codebase. Namely, the server may re-perform the entire build process and/or just re-perform the obfuscation in an attempt to sufficiently obfuscate the authorization keys. The server may apply the same obfuscation technique utilized in the previous iteration of the build process, or the server may apply a different obfuscation technique. By applying a different obfuscation technique during the re-performed build process or re-performed obfuscation, the server may ensure a more secure CI codebase through two layers of obfuscation, thus making the CI codebase more difficult to decode or interpret.

In these embodiments, the server may also scan the re-obfuscated CI pipeline codebase to determine the presence or the absence of the authorization key. Similar to the re-obfuscation, the server may apply an identical scanning protocol to the re-obfuscated CI codebase as the server applied to the obfuscated CI codebase, or the server may apply a different scanning protocol. For example, if the server utilized a syntax model when scanning for authorization keys in the obfuscated CI codebase, the server may again utilize the syntax model to scan the re-obfuscated CI codebase and/or the server may scan the re-obfuscated codebase based upon stored characteristic features corresponding to a particular contributor (e.g., operator of a contributor station 110a-110d).

In any event, should the server scan the re-obfuscated CI codebase and identify an authorization key that has not been sufficiently obfuscated, the server may iteratively perform the obfuscate and scanning procedures until all authorization keys in the CI codebase are sufficiently obfuscated. It should be understood that the server may use any procedure and/or protocol necessary and/or sufficient to determine whether an authorization key is sufficiently obfuscated. In embodiments, the server may determine all authorization keys are sufficiently obfuscated when all protocols/procedures employed to identify the authorization keys fail to identify at least one authorization key contained in the obfuscated CI codebase. Moreover, the server may then designate the absence of an authorization key in the obfuscated CI codebase, and proceed to push the obfuscated CI codebase containing the codebase update to the user device via the network.

In embodiments, the codebase update is a first update, the authorization key is a first authorization key and has a first syntax, and the obfuscated CI pipeline codebase is a first obfuscated CI pipeline codebase. Further in these embodiments, the CI server may receive a second update to the CI pipeline codebase, and the second update may include a second authorization key with a second syntax. The CI server may then store the second authorization key in the one or more memories, and perform the build process to integrate the second update into the CI pipeline codebase. Thus, and as discussed herein, the CI server may accommodate multiple authorization keys with different syntaxes. For example, the first authorization key may contain a first number of characters, and the second authorization key may contain a second number of characters that is different from the first number of characters. Additionally, the first authorization key may contain specific characters that the second authorization key does and/or cannot contain. However, it should be understood that the syntaxes of the first and second authorization keys may be different in any fashion, and/or the first and second authorization keys may differ from one another in any suitable way.

Moreover, the build process corresponding to the second update may include the obfuscation, and the obfuscation may create a second obfuscated CI pipeline codebase. For example, the CI server may apply an identical obfuscation technique to the second update as was applied to the first update. Alternatively, the CI server may apply a different obfuscation technique to the second update if, for example, the CI server determines the second authorization key may benefit from a different obfuscation technique based on the second syntax of the second authorization key.

Thereafter, the CI server may scan the second obfuscated CI pipeline codebase to determine a presence or an absence of the second authorization key. Similar to the subsequent build process to obfuscate the second obfuscated CI pipeline codebase, the server may apply an identical scanning protocol to the second obfuscated CI codebase as the server applied to the first obfuscated CI pipeline codebase, or the server may apply a different scanning protocol. For example, if the server utilized a syntax model when scanning for authorization keys in the first obfuscated CI pipeline codebase, the server may again utilize the syntax model to scan the second obfuscated CI pipeline codebase and/or the server may scan the second obfuscated CI pipeline codebase based upon stored characteristic features corresponding to a particular contributor (e.g., operator of a contributor station 110a-110d).

In embodiments, scanning the obfuscated CI pipeline codebase further includes the server using a probabilistic interpretation to determine the presence or the absence of the authorization key. To illustrate, and in accordance with embodiments herein, the server may apply various protocols and/or models while scanning the obfuscated CI pipeline codebase in an attempt to identify unobfuscated authorization keys. Based on the protocols and/or models, the server may identify portions of the obfuscated CI pipeline codebase that are similar to the known unobfuscated authorization keys. For example, the server may utilize a threshold similarity level to determine whether an identified portion of the obfuscated CI pipeline codebase should be further analyzed. The threshold similarity level may correspond to a number of matching characters between the identified portion of the obfuscated CI pipeline codebase and a respective known unobfuscated authorization key.

As an illustration, assume the server finds a portion of the obfuscated CI pipeline codebase that includes a large number of identical characters to a respective known unobfuscated authorization key. The server may further determine that the identical characters are listed in the portion of the obfuscated CI pipeline codebase in an identical sequence to the respective known unobfuscated authorization key. Thus, the server may determine that the found/identified portion of the obfuscated CI pipeline codebase likely represents the known unobfuscated authorization key in a poorly obfuscated fashion. Once the server makes such a probabilistic determination, the server may re-perform the build process and/or re-perform the obfuscation to adequately obfuscate the poorly obfuscated authorization key.

Moreover, if the server identifies a respective authorization key that was not adequately obfuscated during a build process, the server may direct a subsequent scan of the obfuscated CI pipeline codebase towards identifying the respective authorization key. In this manner, the server may scan the codebase by only searching for keys the server knows may not be adequately obfuscated, thus reducing the processing power involved in the build process, and increasing the efficiency of the build process overall.

By providing systems and methods that allow facilitating authorization key obfuscation validation as described herein, various advantages are achieved. For example, the systems and methods provide and/or are implemented through the use of a device(s) that provide information particularly suited for use with other features of the systems and methods to facilitating authorization key obfuscation validation. Notably, the systems and methods provide a seamless, real-time solution to authorization key obfuscation by performing such obfuscation prior to transmitting any authorization keys to a user device and automatically validating the fidelity of the obfuscation techniques. Other advantages include a variety of improvements over traditional eventing systems.

For example, the systems (100, 200) identify and store authorization keys prior to the build process. Thus, the systems (100, 200) do not suffer from an inability to validate the obfuscation process because the systems (100, 200) can accurately and efficiently check the obfuscated codebase for the original, unobfuscated authorization keys. In this manner, the methods and systems of the present disclosure remove any security risk posed by a user (client) removing obfuscation procedures from the build process.

Further, the methods and systems of the present disclosure process the codebase updates in a fluid, efficient manner. This allows the CI server to seamlessly receive and integrate multiple updates simultaneously. Moreover, the algorithmic, dynamic architecture of the methods and systems of the present disclosure substantially reduce the bottlenecking of processing speeds typically encountered with traditional systems and methods.

Moreover, the systems (100, 200) allow the authorization keys to change between obfuscation events without any increased security risk. The system (100, 200) performs a straightforward, ubiquitous validation procedure that enables the syntax, formatting, etc. of the authorization keys to change without invalidating the procedure. In this manner, the system (100, 200) permits operators (e.g., those operating the contributor stations 110a-110d) to structure their authorization keys in whatever way they deem appropriate. Thus, the system (100, 200) increases the overall flexibility of the continuous integrated pipeline architecture by not requiring a uniform formatting across all authorization keys contained in codebase contributions. Taken together, these advantages, among others, greatly increase the throughput and efficiency of CI pipelines through the dynamic, adaptive architecture disclosed herein.

As will be apparent from the above description, and as should be appreciated with respect to all examples presented herein, the functions or operations shown in FIG. 4 may be performed in any suitable order, any desired number of times, and/or with any suitable variation to the particular order and/or combination shown so as to achieve a desired result, such as a desired manner of facilitating authorization key obfuscation validation.

IV. Additional Considerations

The following additional considerations apply to the foregoing discussion. Throughout this specification, plural instances may implement functions, components, operations, or structures described as a single instance. As noted above, although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the user device 102, the continuous integration server 104, and/or any other computing devices within the example system (100, 200) in any suitable combination). The routines may be included as part of any of the modules described in relation to FIGS. 1 and/or 2 or as part of a module that is external to the system illustrated by FIGS. 1 and/or 2. For example, the methods or portions thereof may be part of a browser application(s) or an application(s) running on any of the devices in the example system (100, 200) as a plug-in or other module of the browser application. Further, the methods may be employed as "software-as-a-service" to provide, for example, the user device 102, the continuous integration server 104, and/or any other computing devices with access to the example system (100, 200).

Additionally, certain aspects are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic region (e.g., within a home environment, an office environment, or a server farm). In other example embodiments, the one or more processors or processor-implemented modules may be distributed across a number of geographic regions.

Still further, the figures depict preferred embodiments of example systems (100, 200) and methods for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for systems and methods for facilitating authorization key obfuscation validation. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and apparatuses disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

The patent claims at the end of this patent application are not intended to be construed under 35 U.S.C. § 108(f) unless traditional means-plus-function language is expressly recited, such as "means for" or "step for" language being explicitly recited in such claims. The systems and methods described herein are directed to an improvement to computer functionality, and improve the functioning of conventional computers.

What is claimed is:

1. An authorization key obfuscation validation device for validating authorization key obfuscation in a continuous integration (CI) pipeline codebase, the device comprising:

a transceiver;
one or more memories; and
one or more processors interfacing with the transceiver and the one or more memories, and configured to:
receive an update to the CI pipeline codebase, the update including an authorization key,
store the authorization key in the one or more memories,
perform a build process to integrate the update into the CI pipeline codebase, wherein the build process includes an obfuscation, and wherein the obfuscation creates an obfuscated CI pipeline codebase, and
scan the obfuscated CI pipeline codebase to determine a presence or an absence of the authorization key.

2. The authorization key obfuscation validation device of claim 1, wherein the authorization key has a syntax and the one or more processors are further configured to automatically identify the authorization key from the update based upon the syntax.

3. The authorization key obfuscation validation device of claim 2, wherein determining the presence of the authorization key indicates the one or more processors identified at least a portion of the syntax in the obfuscated CI pipeline codebase, and wherein the one or more processors are further configured to retrieve the obfuscation from an external obfuscation database.

4. The authorization key obfuscation validation device of claim 1, wherein the update is a first update, the authorization key is a first authorization key and has a first syntax, the obfuscated CI pipeline codebase is a first obfuscated CI pipeline codebase, and wherein the one or more processors are configured to:
receive a second update to the CI pipeline codebase, the second update including a second authorization key with a second syntax,
store the second authorization key in the one or more memories,
perform the build process to integrate the second update into the CI pipeline codebase, wherein the build process includes the obfuscation, and wherein the obfuscation creates a second obfuscated CI pipeline codebase, and
scan the second obfuscated CI pipeline codebase to determine a presence or an absence of the second authorization key.

5. The authorization key obfuscation validation device of claim 1, wherein the authorization key comprises (i) a first key with a first syntax and (ii) a second key with a second syntax.

6. The authorization key obfuscation validation device of claim 1, wherein the one or more processors are further configured to scan the obfuscated CI pipeline codebase using a probabilistic interpretation to determine the presence or the absence of the authorization key.

7. The authorization key obfuscation validation device of claim 1, wherein responsive to determining the presence of the authorization key, the one or more processors are further configured to:
(a) perform at least the obfuscation creating a re-obfuscated CI pipeline codebase,
(b) scan the re-obfuscated CI pipeline codebase to determine the presence or the absence of the authorization key, and
(c) iteratively perform steps (a)-(b) until scanning the obfuscated CI pipeline codebase determines the absence of the authorization key.

8. An authorization key obfuscation validation method for validating authorization key obfuscation in a continuous integration (CI) pipeline codebase, the method comprising:
receiving an update to the CI pipeline codebase, the update including an authorization key;
storing the authorization key in one or more memories;
performing a build process to integrate the update into the CI pipeline codebase, wherein the build process includes an obfuscation, and wherein the obfuscation creates an obfuscated CI pipeline codebase; and
scanning the obfuscated CI pipeline codebase to determine a presence or an absence of the authorization key.

9. The authorization key obfuscation validation method of claim 8, wherein the authorization key has a syntax, and wherein receiving the update to the CI pipeline codebase further includes automatically identifying the authorization key from the update based upon the syntax.

10. The authorization key obfuscation validation method of claim 9, wherein determining the presence of the authorization key includes identifying at least a portion of the syntax in the obfuscated CI pipeline codebase, and wherein performing the build process further includes retrieving the obfuscation from an external obfuscation database.

11. The authorization key obfuscation validation method of claim 8, wherein the update is a first update, the authorization key is a first authorization key and has a first syntax, the obfuscated CI pipeline codebase is a first obfuscated CI pipeline codebase, and wherein the method further comprises:
receiving a second update to the CI pipeline codebase, the second update including a second authorization key with a second syntax;
storing the second authorization key in the one or more memories;
performing the build process to integrate the second update into the CI pipeline codebase, wherein the build process includes the obfuscation, and wherein the obfuscation creates a second obfuscated CI pipeline codebase; and
scanning the second obfuscated CI pipeline codebase to determine a presence or an absence of the second authorization key.

12. The authorization key obfuscation validation method of claim 8, wherein the authorization key comprises (i) a first key with a first syntax and (ii) a second key with a second syntax.

13. The authorization key obfuscation validation method of claim 8, wherein scanning the obfuscated CI pipeline codebase further includes using a probabilistic interpretation to determine the presence or the absence of the authorization key.

14. The authorization key obfuscation validation method of claim 8, wherein, responsive to determining the presence of the authorization key, the method further comprises:
(a) performing at least the obfuscation creating a re-obfuscated CI pipeline codebase;
(b) scanning the re-obfuscated CI pipeline codebase to determine the presence or the absence of the authorization key; and
(c) iteratively performing steps (a)-(b) until scanning the obfuscated CI pipeline codebase determines the absence of the authorization key.

15. A non-transitory computer readable storage medium comprising non-transitory computer readable instructions stored thereon for validating authorization key obfuscation in a continuous integration (CI) pipeline codebase, wherein the instructions when executed on one or more processors cause the one or more processors to:

receive an update to the CI pipeline codebase, the update including an authorization key;

store the authorization key in one or more memories;

perform a build process to integrate the update into the CI pipeline codebase, wherein the build process includes an obfuscation, and wherein the obfuscation creates an obfuscated CI pipeline codebase; and scan the obfuscated CI pipeline codebase to determine a presence or an absence of the authorization key.

16. The non-transitory computer readable storage medium of claim 15, wherein the authorization key has a syntax, and wherein the instructions when executed on one or more processors further cause the one or more processors to receive the update to the CI pipeline codebase by automatically identifying the authorization key from the update based upon the syntax.

17. The non-transitory computer readable storage medium of claim 16, wherein the instructions when executed on one or more processors further cause the one or more processors to:

determine the presence of the authorization key by identifying at least a portion of the syntax in the obfuscated CI pipeline codebase; and perform the build process by retrieving the obfuscation from an external obfuscation database.

18. The non-transitory computer readable storage medium of claim 15, wherein the update is a first update, the authorization key is a first authorization key and has a first syntax, the obfuscated CI pipeline codebase is a first obfuscated CI pipeline codebase, and wherein the instructions when executed on one or more processors further cause the one or more processors to:

receive a second update to the CI pipeline codebase, the second update including a second authorization key with a second syntax;

store the second authorization key in the one or more memories;

perform the build process to integrate the second update into the CI pipeline codebase, wherein the build process includes the obfuscation, and wherein the obfuscation creates a second obfuscated CI pipeline codebase; and scan the second obfuscated CI pipeline codebase to determine a presence or an absence of the second authorization key.

19. The non-transitory computer readable storage medium of claim 15, wherein, responsive to determining the presence of the authorization key, the instructions when executed on one or more processors further cause the one or more processors to:

(a) perform at least the obfuscation creating a re-obfuscated CI pipeline codebase;

(b) scan the re-obfuscated CI pipeline codebase to determine the presence or the absence of the authorization key; and (c) iteratively perform steps (a)-(b) until scanning the obfuscated CI pipeline codebase determines the absence of the authorization key.

20. The non-transitory computer readable storage medium of claim 15, wherein the authorization key comprises (i) a first key with a first syntax and (ii) a second key with a second syntax, and wherein the instructions when executed on one or more processors further cause the one or more processors to scan the obfuscated CI pipeline codebase by using a probabilistic interpretation to determine the presence or the absence of the authorization key.

* * * * *